A. A. MENDENHALL.
CUSHIONED WHEEL.
APPLICATION FILED APR. 9, 1920.
1,374,753.
Patented Apr. 12, 1921.
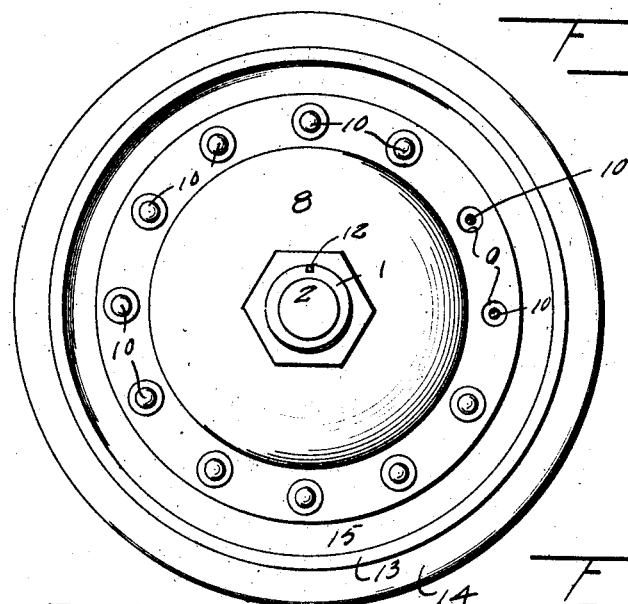
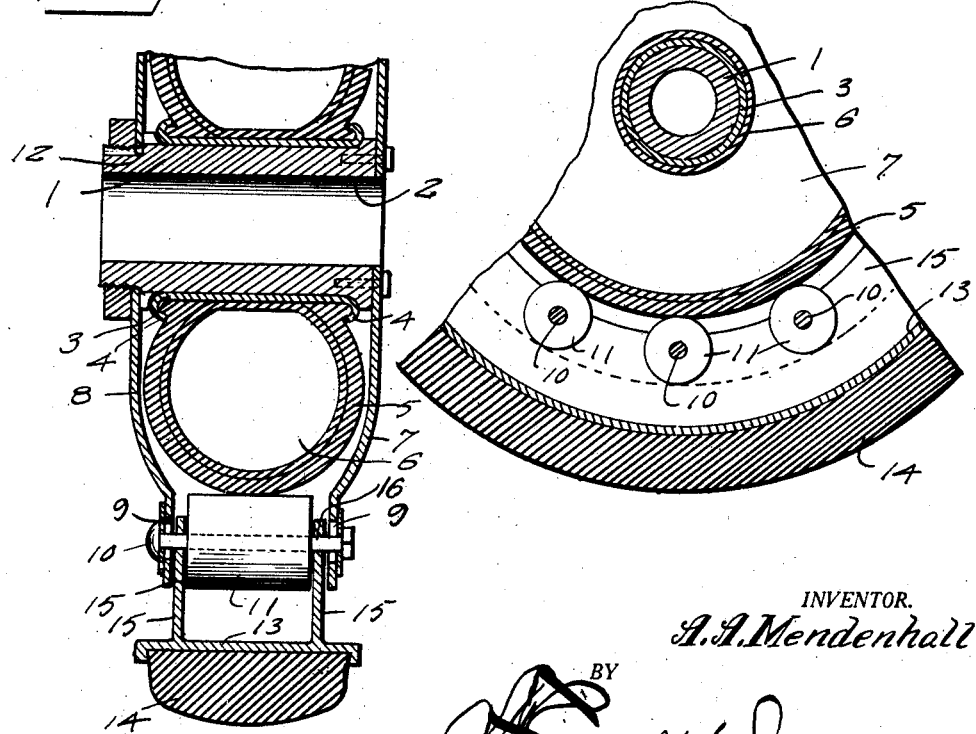
INVENTOR.
A. A. Mendenhall
BY
ATTORNEY.

UNITED STATES PATENT OFFICE.

AUSTIN A. MENDENHALL, OF DULUTH, MINNESOTA.

CUSHIONED WHEEL.

1,374,753.

Specification of Letters Patent. Patented Apr. 12, 1921.

Application filed April 9, 1920. Serial No. 372,454.

*To all whom it may concern:*

Be it known that I, AUSTIN A. MENDENHALL, a citizen of the United States, residing at Duluth, in the county of St. Louis and State of Minnesota, have invented certain new and useful Improvements in Cushioned Wheels; and I do hereby declare the following to be a full, clear, and exact description of the invention, such as will enable others skilled in the art to which it appertains to make and use the same.

This invention relates to new and useful improvements in cushioned wheels and has for its primary object the provision of a pneumatic cushioning means between the hub and rim of the wheel so that shocks and jars may be absorbed thereby without the annoyance and expense caused by blowouts and punctures.

Another object of this invention is the provision of cushioning anti-friction means between the cushioning means and the rim to reduce the wear on said cushioning means and further aid to the resiliency of the wheel.

A still further object of this invention is the provision of a cushion wheel of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawing, in which:—

Figure 1 is a front elevation illustrating a cushioned wheel constructed in accordance with my invention, Fig. 2 is a vertical sectional view of the same, Fig. 3 is a transverse sectional view, illustrating the means of securing the pneumatic cushioning means to the hub and also the mounting of the anti-friction cushioning rollers.

Referring in detail to the drawing, the numeral 1 indicates as an entirety, a hub provided with the usual spindle or axle receiving opening 2 and has mounted thereon an annular rim 3 provided at each edge with tire engaging flanges 4 adapted to retain on the hub a shoe 5 and in which is located the usual pneumatic tube 6 for inflating said shoe.

Guard plates 7 and 8 are mounted on the hub 1 and project beyond the shoe 5 and are provided with a series of comparatively large openings 9 to receive bolts 10. The bolts 10 have journaled thereon anti-friction rollers 11 constructed of rubber or any other material suitable for the purpose and are adapted to contact with the shoe 5 as clearly shown in the drawing. The plate 7 is secured to the hub 1 in any desired manner, while the plate 8 is keyed to the hub as shown at 12 and also is detachably secured to said hub so that the same may be removed when desiring to inflate the inner tube or to remove the shoe 5 from the rim 3 for any purpose.

An outer tire supporting rim 13 supports a solid tire 14 constructed from rubber or any other material suitable for the purpose and said rim 13 has formed thereon inwardly extending and relatively spaced plates 15 provided with openings 16 to receive the bolts 10 and are positioned on each end of the roller, thus it will be seen that the outer rim 13 may have relative movement in relation to the hub 2 and is supported through the cushioning and anti-friction rollers 11 and the pneumatic shoe 5 so that when the tire 14 engages obstructions or irregular places in the roadway, the shoe 5 will assume the shock and thereby provide a comparatively easy riding wheel that does not employ a pneumatic tire which engages the ground, thus obviating punctures and blow-outs. It is also to be noted that this wheel can be readily and conveniently assembled and disassembled when desired and that any of the parts can be readily removed and replaced in case such parts become worn or mutilated.

While I have shown and described the preferred embodiment of my invention, it will be understood that minor changes in construction, combination, and arrangement of parts may be made without departing from the spirit and scope of the invention as claimed.

Having thus described my invention what is claimed is:

A cushion wheel including a hub having a pneumatic cushioning element and a rim supporting a tire, relatively spaced inwardly extending annular plates formed on said rim, bolts carried by said plates and projecting beyond the same, rollers on said bolts and engaging the cushioning elements, and guard plates secured to the hub on each side of the cushioning element and slidably receiving the annular plates and having openings to receive the ends of the bolts, said openings being of a diameter greater than the diameter of the bolts to permit the hub and rim to have relative movement in relation to each other.

In testimony whereof I affix my signature in presence of two witnesses.

AUSTIN A. MENDENHALL.

Witnesses:
  BERNICE CROWLEY,
  FLORENCE B. MENDENHALL.